United States Patent Office 2,955,423
Patented Oct. 11, 1960

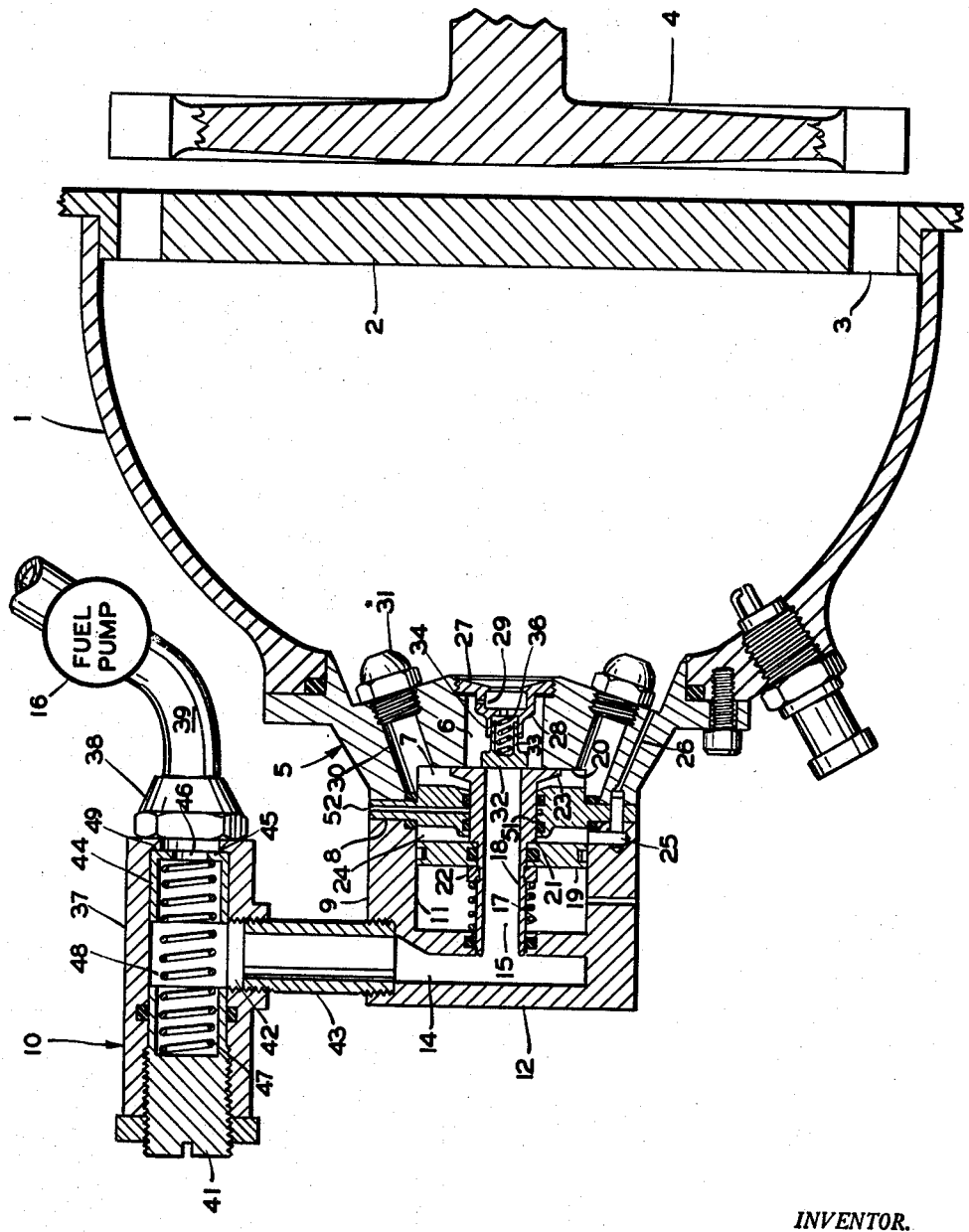

2,955,423

COMBUSTION CHAMBER LIQUID FUEL FLOW CONTROL MEANS

Abe J. Perle, Verona, N.J., assignor to The Bendix Corporation, a corporation of Delaware Filed Oct. 25, 1954, Ser. No. 464,272

6 Claims. (Cl. 60—39.28)

This invention is concerned with means for controlling liquid fuel flow to a combustion chamber. While the invention is subject to wide application and use with combustion chambers in various environments, it finds particular use in association with a combustion chamber of a hot gas turbine engine starter.

An object of the invention is to so control liquid fuel flow to a combustion chamber as to provide a gradual buildup of combustion chamber pressure.

A further object of the invention is to cause a flow of fuel to a combustion chamber in stages.

Another object of the invention is to control the flow of liquid fuel, such as propyl-nitrate, to the combustion chamber of a hot gas turbine starter in stages so as to gradually build up the pressure of combustion gases to provide a safe and smooth operation of the turbine starter.

The invention further lies in its particular construction, as well as in the general organization and specific cooperation of the several elements thereof to produce the results intended.

The foregoing and other objects and advantages of the invention will appear more fully hereinafter from a consideration of the detailed description which follows, taken in conjunction with the accompanying drawing wherein an embodiment of the invention is illustrated by way of example. It is to be expressly understood, however, that the drawing is for purposes of illustration and description only, and is not intended as a definition of the limits of the invention.

The drawing is a cross section of combined mono propellant liquid fuel flow control means and a combustion chamber, wherein the invention is embodied.

In describing the invention in further detail, reference is directed to the drawing wherein there is disclosed a high pressure combustion chamber 1 closed over at one end by a suitable head 2 having a plurality of nozzles 3 through which hot gases of combustion created in the chamber escape to impinge against and drive a suitable hot gas turbine 4 of engine starter mechanism, not shown. The opposite end of the combustion chamber is closed over by a fuel flow injector head 5 having an axial flow inlet port 6. Port 6 opens out into a recess 7 of relatively larger diameter in the injector head. Recess 7 is closed over by a partition block 8 and provides a chamber of narrow depth.

Mounted to the outer face of the partition block 8 is a cup member 9 which provides a cylindrical chamber 11. The end wall 12 of chamber 11 is thickened and includes a radial passage 14 that communicates at its upper end with a fuel flow limiting valve 10. The latter limits fuel flow from a connected fuel supply pressure pump 16 to passage 14. Passage 14 communicates with a passage 15 through a horizontally disposed hollow shaft 18. The latter is slidably supported at its left end in the inner face of the end wall 12, and, when moved leftward, it is adapted to slide a little into the radial passage 14. The right end portion of shaft 18 is of thickened diameter and projects axially through partition block 8 in which it is further supported for slidable movement. The thickened portion of shaft 18 provides a shoulder 21 against which limits a piston 19 carried by shaft 18. A thickened ring 22, snapped upon shaft 18 up against the left face of the piston, secures the position of the latter against shoulder 21. The right end wall of shaft 18 is of relatively greater diameter than the rest of the shaft because of a peripheral flange 23. A coil spring 17 about shaft 18 and compressed between end wall 12 and ring 22 constantly tensions shaft 18 to the right. When so tensioned, flange 23 limits against the wall 20 of recess 7 about port 6. By this arrangement, passage 15 through shaft 18 is blocked off from recess chamber 7, and is in direct communication with inlet port 6. It is to be noted, that when shaft 18 is tensioned as above, the piston element 19 is positioned a slight distance from the partition block to provide a piston chamber 24. Chamber 24 communicates by a narrow passage 25, and by a more slender passage 26, with the combustion chamber. By this construction combustion gases flow through the connecting passages to the piston chamber 24. Pressure builds up in the latter and, upon the pressure overcoming the tension of spring 17, piston 21 is moved to the left to unseat flange 23 from the recess wall 20. This establishes communication of fuel passage 15 through shaft 18 with the recess chamber 7. Due to the nature of the connecting passages 25, 26, the pressure build-up in the piston chamber is not sudden. Thereby a violent and abrupt actuation of piston 19 is avoided.

Inlet port 6 is fitted at its inner end with a nozzle member 27 which is intended to supply a first stage, or minimum flow of fuel from passage 15 to the combustion chamber to start combustion. Nozzle member 27 is provided with a crown portion 28 which projects into port 6 in spaced relation to the wall of the latter. This crown portion has a plurality of fine orifices 29 in its periphery, through which a limited fuel flow is provided to the combustion chamber.

The recess chamber 7 communicates through a plurality of passages 30 and connected nozzles 31 with the combustion chamber. It is intended, when communication of recess chamber 7 is established with fuel flow passage 15, that a second stage and larger flow of fuel will pass through the nozzles 31 to the combustion chamber.

Fuel flow through the port 6 nozzle member 27 is normally blocked by a spring tensioned valve. The latter includes a valve head 32 of a diameter relatively smaller than that of port 6, but slightly greater than that of shaft passage 15. Valve head 32 is designed to abut against the end wall of shaft 18 to seal over passage 15. To this end, valve head 32 carries an axial extension 33 that is slidable in an extended sleeve portion 34 of nozzle member 27. A spring 36 limited in sleeve 34 and in an opposed recess of extension 33 constantly extends the valve head 32 to seal off passage 15. It is designed that valve 32 is not to crack open until the fuel flow pressure in passage 15 builds up to a predetermined degree.

Fuel flow to passage 15 is controlled by the flow limiting valve 10. The latter comprises an elongated cylinder 37, one end of which connects by a fitting 38 and line 39 to the fuel supply pump 16. The other end of the cylinder is closed over by an adjustable threaded plug 41. An outlet port 42 from the mid portion of the cylinder connects by a line 43 with the fuel passage 14. Slidable in cylinder 37 is a sleeve valve 44 that is open at one end, and at the other is inwardly flanged as at 45 to provide an inlet port 46. The latter affords communication of the pump supply line through the cylinder to the outlet port 42. The inner end of plug 41 is recessed as at 47 in opposed relation to the open end of sleeve 44. The sleeve valve 44 is designed to slide over the outlet port 42 to reduce fuel flow therethrough. A coil spring 48, limited in the open sleeve and the recessed end of plug 41, normally tensions the sleeve to a position limited by a shoulder 49, in which position the sleeve valve is free of the outlet port. In the operation of the fuel flow limiting valve it can be seen, that as the flow of fuel pumped into the valve cylinder 37 increases beyond a rated maximum, it will act against the flange 45 of the valve to slide the sleeve against the tension of spring 48 progressively over the outlet port. Flow through the outlet port is progressively decreased as the sleeve is moved over the outlet. By this arrangement, the flow of fuel to the passage 15 is held constant despite variations in fuel pump pressure.

In the general operation of the device of the present invention, fuel pumped through the flow limiting valve passes to the shaft passage 15. As this fuel pressure builds up sufficiently to overcome the opposed tension of the coil spring 36 of the valve mechanism, the valve head 32 is unseated. Whereupon, fuel flows around the latter into port 6 and through the orifices of nozzle member 27 to the combustion chamber. Combustion takes place in the latter, and the gases of combustion escape through the combustion head nozzles 3 to attack the turbine 4. The gases of combustion also pass through the restricted passages 26, 25 to the piston chamber 24. As pressure builds up in the latter sufficiently to overcome the opposed tension of coil spring 17, the piston is actuated to carry the flanged end 23 of shaft 18 free of the right wall of chamber 7. Consequent upon the latter action, pressure fuel flows from shaft 18 through chamber 7 and nozzles 31 to the combustion chamber in increased volume. This increased volume flow represents the second stage of fuel flow. Increased combustion takes place, and the gases escape to drive the turbine member.

By this structure it is clear, that a gradual build-up of pressure gases takes place in the combustion chamber 1, whereby a smooth operation is imparted to the turbine and to the starter mechanism associated with the latter. This gradual build-up of combustion gas pressures avoids a sudden and violent attack of high pressure gases upon the turbine, which might otherwise occur were a single stage, full flow of fuel to the combustion chamber to take place. By-pass of fuel or combustion gas around shaft 18 from one side of the partition block 8 to the other is avoided by suitable sealing elements 51 in the partition block about shaft 18 and by atmospheric vents 52 that extend radially through the partition block between the sealing elements.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described, but also in all such forms and modifications as may be reasonably construed to be within the spirit of the invention and the scope of the appended claims.

I claim:

1. Apparatus for staging fuel flows in a liquid fuel combustion chamber so as to provide a limited fuel flow for initial combustion and a larger flow subsequent to initial combustion, comprising a combustion chamber having an axial fuel inlet opening, a fuel injector block closing off the inlet opening, nozzle means in the injector block for supplying limited fuel flow to the combustion chamber for starting combustion therein, other nozzle means in the injector block for supplying a larger flow of fuel to the combustion chamber after starting combustion has taken place, a fuel supply line direct to a passage in the injector block that is common to both nozzle means, first spring tensioned slidable valve means normally closing off the limited fuel flow nozzle means to the common passage and adapted to slide open under a predetermined pressure of fuel in the supply line, second spring tensioned slidable valve means normally closing off the larger fuel flow nozzle means from the common passage, piston means associated with the second valve means and actuated by pressure of gases of combustion to slide open the second valve means to effect communication of the common passage with the larger fuel flow nozzle means, a piston chamber in which the piston is operable, and port means communicating the piston chamber with the combustion chamber, through which port means gases of combustion may pass to the piston chamber to operate the piston means.

2. The combination of the apparatus set forth in claim 1 with a hot gas turbine of engine starter mechanism, wherein the combustion chamber includes an exit nozzle head having a plurality of nozzles for communicating the hot gases of combustion from the combustion chamber to the turbine.

3. The combination of the apparatus set forth in claim 1 with a hot gas turbine of engine starter mechanism, wherein the combustion chamber includes an exit nozzle head having a plurality of nozzles for communicating the hot gases of combustion from the combustion chamber to the turbine, and wherein fuel flow pressure limiting means is interposed in the fuel supply line, between the common passage and a fuel pump in the supply line.

4. In the apparatus as set forth in claim 1 wherein fuel flow constant pressure control means is interposed in the fuel supply line, between a fuel pump in the line and the common passage in the injector block.

5. The combination of a combustion chamber and valve controlled fuel flow nozzle means connected to the combustion chamber, wherein the valve controlled fuel flow nozzle means comprises a nozzle head adapted to close over an open end of the combustion chamber and having an axial port therethrough, a recess in the outside end of the nozzle head coaxial with and of greater diameter than the axial port, a partition block closing over the recess, a cup-like piston cylinder member mounted over the outer face of the partition block and attached thereto, a hollow piston shaft supported for slidable movement in the partition block and in an end wall of the piston cylinder member, nozzled passages communicating the nozzle head recess with the combustion chamber, a head on an end of the shaft located in the recess adapted to close over the axial port, a piston carried by the shaft and slidable in the piston cylinder, spring means tensioning the piston shaft in a direction where the head thereof closes over the axial port, shoulder means on the hollow shaft holding the piston, means communicating the space between the piston and partition block with the combustion chamber for actuating the piston against the spring means, a nozzle member fitted in the axial port having a plurality of fine orifices communicating the axial port with the combustion chamber, a fuel inlet in said end wall in communication with the passage within the hollow piston shaft, and a valve member normally closing off communication of the passage within the hollow shaft with the nozzle member, the valve member comprising a valve head seatable over the end opening of the hollow shaft, a recessed stem of the valve head slidable in a recessed extension of the nozzle member, and spring means confined in the recessed stem and extension tensioning the valve head to its seated position.

6. In the combination as in claim 5, wherein a pressure fuel supply pump is provided, and fuel flow limiting means is connected between the supply pump and the fuel inlet passage.

(References on following page)

References Cited in the file of this patent

UNITED STATES PATENTS

| | | |
|---|---|---|
| 2,581,275 | Mock | Jan. 1, 1952 |
| 2,590,853 | Fulton | Apr. 1, 1952 |
| 2,632,298 | Willgoos | Mar. 24, 1953 |
| 2,636,553 | Ballantyne et al. | Apr. 28, 1953 |
| 2,667,743 | Lee | Feb. 2, 1954 |
| 2,724,239 | Fox | Nov. 22, 1955 |
| 2,763,126 | Halford et al. | Sept. 18, 1956 |
| 2,829,491 | Teague | Apr. 8, 1958 |
| 2,869,321 | Welch et al. | Jan. 20, 1959 |